United States Patent
Xu

(10) Patent No.: US 10,757,018 B2
(45) Date of Patent: *Aug. 25, 2020

(54) METHOD AND APPARATUS FOR FORWARDING MPLS DATA PACKET

(71) Applicant: Huawei Technologies Co., Ltd., Shenzhen (CN)

(72) Inventor: Xiaohu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,965

(22) Filed: Mar. 21, 2019

(65) Prior Publication Data

US 2019/0222513 A1 Jul. 18, 2019

Related U.S. Application Data

(63) Continuation of application No. 15/044,779, filed on Feb. 16, 2016, now Pat. No. 10,277,504, which is a
(Continued)

(30) Foreign Application Priority Data

Aug. 15, 2013 (CN) .......................... 2013 1 0356579

(51) Int. Cl.
*H04L 12/66* (2006.01)
*H04L 12/723* (2013.01)
(Continued)

(52) U.S. Cl.
CPC .......... *H04L 45/50* (2013.01); *H04L 12/4633* (2013.01); *H04L 45/38* (2013.01); *H04L 45/745* (2013.01)

(58) Field of Classification Search
CPC ...................................................... H04L 45/38
See application file for complete search history.

(56) References Cited

U.S. PATENT DOCUMENTS 6,901,048 B1 5/2005 Wang
8,259,564 B1 9/2012 Gredler
(Continued)

FOREIGN PATENT DOCUMENTS

CN 1750504 A 3/2006
CN 101820395 A 9/2010
(Continued)

OTHER PUBLICATIONS

Rosen et al., "Multiprotocol Label Switching Architecture," Network Working Group, Request for Comments: 3031, Category: Standards Track, pp. 1-61, The Internet Society (Jan. 2001).
(Continued)

*Primary Examiner* — Guang W Li
(74) *Attorney, Agent, or Firm* — Leydig, Voit & Mayer, Ltd.

(57) ABSTRACT

A method and an apparatus for forwarding an MPLS data packet are provided, which are used in an environment of hybrid networking of an SR network and a non-SR network. The method is as follows: when obtaining a to-be-sent MPLS data packet, a first SR router in an SR network determines whether a next-hop router supports an SR characteristic; the first SR router encapsulates the MPLS data packet into an IP tunnel when determining that the next-hop router does not support the SR characteristic, and sends an encapsulated MPLS data packet to the next-hop router to enable the encapsulated MPLS data packet to be forwarded, based on an IP routing table, to a second SR router. In this
(Continued)

way, correct forwarding of an MPLS data packet is completed in an environment of hybrid networking of an SR router and a non-SR router.

18 Claims, 4 Drawing Sheets

Related U.S. Application Data continuation of application No. PCT/CN2014/081725, filed on Jul. 7, 2014.

(51) Int. Cl.
H04L 12/721 (2013.01)
H04L 12/46 (2006.01)
H04L 12/741 (2013.01)

(56) References Cited

U.S. PATENT DOCUMENTS

| | | | |
|---|---|---|---|
| 9,049,233 B2* | 6/2015 | Frost | H04L 45/42 |
| 9,178,810 B1 | 11/2015 | Singh | |
| 9,246,838 B1* | 1/2016 | Shen | H04L 47/724 |
| 9,319,312 B2* | 4/2016 | Filsfils | H04L 45/507 |
| 9,369,371 B2 | 6/2016 | Filsfils | |
| 9,450,829 B2 | 9/2016 | Filsfils | |
| 9,491,057 B2* | 11/2016 | Riedl | H04L 45/02 |
| 9,491,058 B2* | 11/2016 | Filsfils | H04L 41/12 |
| 9,497,107 B1* | 11/2016 | Akiya | H04L 45/22 |
| 9,525,619 B2* | 12/2016 | Filsfils | H04L 45/22 |
| 9,559,954 B2* | 1/2017 | Filsfils | H04L 45/02 |
| 9,929,946 B2* | 3/2018 | Filsfils | H04L 69/166 |
| 2006/0215548 A1 | 9/2006 | Le Faucheur | |
| 2007/0127479 A1* | 6/2007 | Sinicrope | H04L 12/4633 370/392 |
| 2011/0205907 A1 | 8/2011 | Kini | |
| 2011/0261812 A1* | 10/2011 | Kini | H04L 12/4633 370/389 |
| 2013/0343204 A1 | 12/2013 | Geib | |
| 2014/0098675 A1* | 4/2014 | Frost | H04L 45/38 370/241.1 |
| 2014/0169370 A1 | 6/2014 | Filsfils | |
| 2014/0177638 A1* | 6/2014 | Bragg | H04L 45/50 370/395.5 |
| 2014/0269266 A1* | 9/2014 | Filsfils | H04L 43/50 370/228 |
| 2014/0317259 A1* | 10/2014 | Previdi | H04L 61/30 709/223 |
| 2014/0369356 A1* | 12/2014 | Bryant | H04L 45/745 370/392 |
| 2015/0030026 A1* | 1/2015 | Kumar | H04L 45/50 370/392 |
| 2015/0103691 A1* | 4/2015 | Bhattacharya | H04L 41/0803 370/254 |
| 2015/0109902 A1* | 4/2015 | Kumar | H04L 41/0668 370/219 |
| 2015/0263940 A1* | 9/2015 | Kini | H04L 45/50 370/236.2 |
| 2016/0087884 A1* | 3/2016 | Xu | H04L 12/4633 370/392 |

FOREIGN PATENT DOCUMENTS

| | | |
|---|---|---|
| CN | 104243311 A | 12/2014 |
| EP | 1791300 A1 | 5/2007 |
| EP | 2490375 A1 | 8/2012 |
| EP | 3148131 A1 | 3/2017 |

OTHER PUBLICATIONS

Filsfils et al., "Segment Routing Use Cases," Network Working Group, Internet-Draft, IETF Trust, Reston, Virginia (Jun. 28, 2013).
Previdi et al., "Segment Routing with IS-IS Routing Protocol," IS-IS for IP Internets, Internet-Draft, IETF Trust, Reston, Virginia (Mar. 20, 2013).
Worster et al., "Encapsulating MPLS in IP or Generic Routing Encapsulation (GRE)," Network Working Group, Request for Comments: 4023, The Internet Society, Reston, Virginia (Mar. 2005).
Kompella et al., "The Use of Entropy Labels in MPLS Forwarding," Internet Engineering Task Force (IETF), Request for Comments: 6790, IETF Trust, Reston, Virginia (Nov. 2012).
Filsfils et al., "Segment Routing Use Cases," Network Working Group, Internet-Draft, IETF Trust, Reston, Virginia (Jul. 2013).
Psenak et al., "OSPF Extensions for Segment Routing," Open Shortest Path First IGP, Internet-Draft, draft-psenak-ospf-segment-routing-extensions-02, pp. 1-25, IETF Trust, Reston, Virginia (Jul. 12, 2013).
Previdi et al., "IS-IS Extensions for Segment Routing," IS-IS for IP Internets, Internet-Draft, draft-previdi-isis-segment-routing-extensions-00, pp. 1-22, IETF Trust, Reston, Virginia (Jun. 28, 2013).

* cited by examiner

METHOD AND APPARATUS FOR FORWARDING MPLS DATA PACKET

CROSS-REFERENCE TO RELATED APPLICATIONS

This application is a continuation of U.S. patent application Ser. No. 15/044,779, filed on Feb. 16, 2016, which is a continuation of International Patent Application No. PCT/CN2014/081725, filed on Jul. 7, 2014, which claims priority to Chinese Patent Application No. 201310356579.0, filed on Aug. 15, 2013. All of the afore-mentioned patent applications are hereby incorporated by reference in their entireties.

TECHNICAL FIELD

Embodiments of the present invention relate to network communications technologies, and in particular, to a method and an apparatus for forwarding an MPLS data packet.

BACKGROUND

Segment routing (SR) is a method for transferring, by a control plane by using the Interior Gateway Protocol (IGP), a Multiprotocol Label Switching (MPLS) label that has a global meaning or local meaning and is corresponding to an SR router. Typical IGPs are the Intermediate System to Intermediate System (IS-IS) protocol and the Open Shortest Path First (OSPF) protocol.

A data plane performs MPLS data packet forwarding based on an MPLS label delivered by a Segment Routing control plane, so as to achieve an objective of simplifying operation and maintenance management of an MPLS network.

To facilitate understanding of a segment routing technical solution, the following example is presented for a scenario where a control plane delivers a label having a global meaning.

Referring to FIG. 1, an egress SR router (that is, element Z) advertises its own node segment label according to a method defined by a segment routing protocol and by using an IGP protocol (such as IS-IS or OSPF) extension, and it is assumed that the node segment label is 65 (see FIG. 1). When an ingress SR router (that is, element A) needs to send an original data packet to Z, the ingress SR router adds a node segment Label (that is, "65") corresponding to Z before the original data packet, and then sends, to a next-hop SR router (that is, element B), an MPLS packet that is formed after the original data packet is encapsulated. In a subsequent process, an SR router (such as elements B, C, and D) that receives the foregoing MPLS data packet forwards hop-by-hop the foregoing MPLS data packet to a destination Z according to the node segment label (that is, "65").

However, a scenario of hybrid networking of an SR router and a non-SR router is not considered in an existing Segment Routing technical solution. Referring to FIG. 2, it is assumed that C does not support an SR characteristic, but according to provisions in ISIS and OSPF protocols, on a control plane, when an ISIS or OSPF node receives a type-length-value (TLV) that the ISIS or OSPF node does not know, the ISIS or the OSPF node still sends the TLV to a neighboring node. That is, when receiving a TLV that includes SR related information (for example, a node segment Label), although C cannot identify the TLV, C still advertises the TLV to a surrounding neighboring node, such as B and D. However, on a data plane, when B forwards, to C, an MPLS data packet (a top label of the data packet is the node segment label corresponding to Z, that is, the label 65) that is received from A and whose destination is Z, C discards the received MPLS data packet because C does not support the SR characteristic (that is, a corresponding MPLS forwarding entry does exist on the data plane).

Therefore, the inventor noticed the following issues exist in the conventional art: when router hybrid networking of an SR router and a non-SR router is used, a packet discard phenomenon occurs because a router does not support an SR characteristic inevitably, which results in that an MPLS data packet cannot be correctly forwarded in a hybrid networking environment.

SUMMARY

Embodiments of the present invention provide a method and an apparatus for forwarding an MPLS data packet, which are used to implement correct forwarding of the MPLS data packet in a scenario of hybrid networking of an SR router and a non-SR router.

Specific technical solutions provided in the embodiments of the present invention are as follows:

According to a first aspect, a method for forwarding an MPLS data packet is provided, including:

receiving, by a first SR router in an SR network, the MPLS data packet; and encapsulating, by the first SR router, the MPLS data packet into an IP tunnel when determining that a next-hop router does not support an SR characteristic, and sending an encapsulated MPLS data packet to the next-hop router to enable the encapsulated MPLS data packet to be forwarded, based on an IP routing table, to a second SR router.

With reference to the first aspect, in a first possible implementation manner, the encapsulating, by the first SR router, the MPLS data packet into an IP tunnel specifically includes:

filling in, by the first SR router, a source address of the IP tunnel with an IP address of the first SR router, and filling in a destination address of the IP tunnel with an IP address of the second SR router.

With reference to the first possible implementation manner of the first aspect, in a second possible implementation manner, the method further includes:

learning, by the first SR router, the IP address of the second SR router according to a node segment label at the top of a label stack of the to-be-sent MPLS data packet, where the node segment label at the top of the label stack of the MPLS data packet is a node segment label of the second SR router.

With reference to the first aspect, in a third possible implementation manner, before the encapsulating, by the first SR router, the MPLS data packet into an IP tunnel, the method includes:

determining, by the first SR router, whether a node segment label of the second SR router is a global label; and if the node segment label is a global label, further determining, by the first SR router, whether a penultimate hop pop PHP operation needs to be performed on the global label, where if the PHP operation needs to be performed, a pop operation is performed on the global label, or if the PHP operation does not need to be performed, a pop operation is not performed on the global label; or if the node segment label is a local label, directly performing, by the first SR router, a pop operation on the local label.

With reference to any one of the foregoing possible implementation manners of the first aspect, in a fourth possible implementation manner, before the encapsulating, by the first SR router, the MPLS data packet into an IP tunnel, the method further includes:

learning, by the first SR router according to a tunnel encapsulation capability advertisement sent by the second SR router, an IP tunnel encapsulation type that is used when the MPLS data packet is encapsulated into the IP tunnel.

According to a second aspect, a first SR router is provided, including:

a communications unit, configured to receive an MPLS data packet; and a processing unit, configured to encapsulate the MPLS data packet into an IP tunnel when determining that a next-hop router does not support an SR characteristic, and send an encapsulated MPLS data packet to the next-hop router by using the communications unit to enable the encapsulated MPLS data packet to be forwarded, based on an IP routing table, to a second SR router.

With reference to the second aspect, in a first possible implementation manner, that the processing unit encapsulates the MPLS data packet into the IP tunnel specifically includes that:

the processing unit fills in a source address of the IP tunnel with an IP address of the first SR router, and fills in a destination address of the IP tunnel with an IP address of the second SR router.

With reference to the first possible implementation manner of the second aspect, in a second possible implementation manner, the processing unit is further configured to:

learn the IP address of the second SR router according to a node segment label at the top of a label stack of the to-be-sent MPLS data packet, where the node segment label at the top of the label stack of the MPLS data packet is a node segment label of the second SR router.

With reference to the second aspect, in a third possible implementation manner, before the processing unit encapsulates the MPLS data packet into the IP tunnel, the following is included:

the processing unit determines whether a node segment label of the second SR router is a global label; and if the node segment label is a global label, he processing unit further determines whether a penultimate hop pop PHP operation needs to be performed on the global label, where if the PHP operation needs to be performed, a pop operation is performed on the global label, or if the PHP operation does not need to be performed, a pop operation is not performed on the global label; or if the node segment label is a local label, he processing unit directly performs a pop operation on the local label.

With reference to any one of the foregoing possible implementation manners of the second aspect, in a fourth possible implementation manner, the processing unit is further configured to:

before encapsulating the MPLS data packet into the IP tunnel, learn, according to a tunnel encapsulation capability advertisement sent by the second SR router, an IP tunnel encapsulation type that is used when the MPLS data packet is encapsulated into the IP tunnel.

In the embodiments of the present invention, when obtaining a to-be-sent MPLS data packet, a first SR router in an SR network determines whether a next-hop router supports an SR characteristic; the first SR router encapsulates the MPLS data packet into an IP tunnel when determining that the next-hop router does not support the SR characteristic, and sends an encapsulated MPLS data packet to the next-hop router to enable the encapsulated MPLS data packet to be forwarded, based on an IP routing table, to a second SR router. In this way, correct forwarding of an MPLS data packet is completed in an environment of hybrid networking of an SR router and a non-SR router, thereby a requirement for incremental deployment of SR networks is met.

DESCRIPTION OF EMBODIMENTS

To support a scenario of hybrid networking of an SR router and a non-SR router, in embodiments of the present invention, a conventional network (that is, a non-SR network) is connected to nodes in a Segment routing network, thereby facilitating incremental deployment of segment routing networks.

The following describes exemplary embodiments of the present invention in detail with reference to accompanying drawings.

Figure 1:
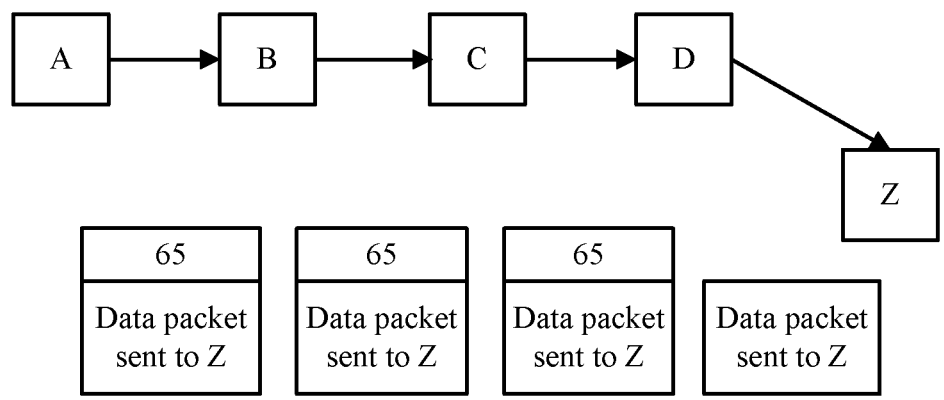
FIG. 1 is a schematic diagram of Segment Routing MPLS forwarding.
Figure 2:
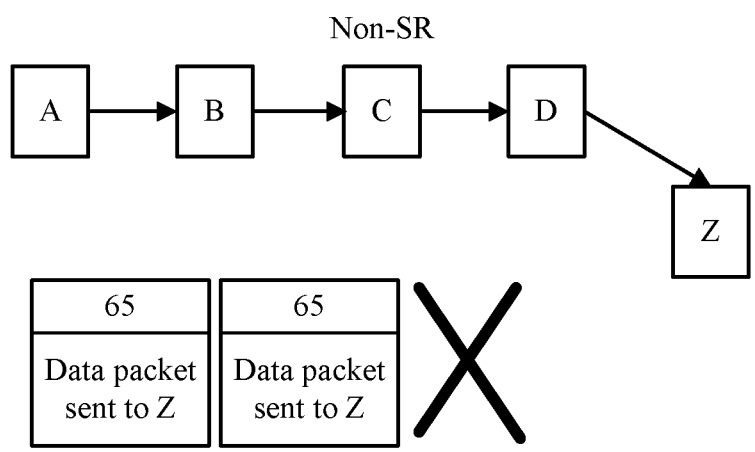
FIG. 2 is a schematic diagram of an error in Segment Routing MPLS forwarding.
Figure 3:
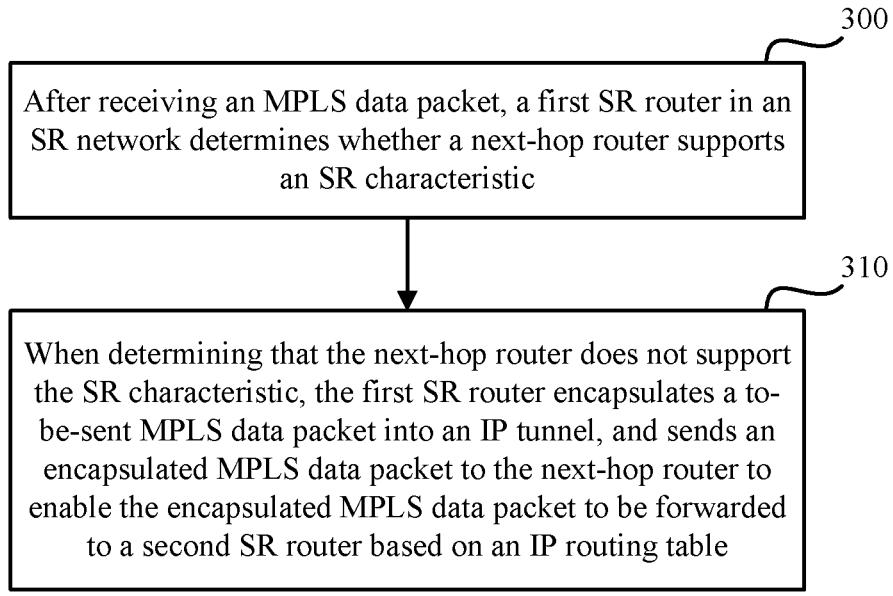
FIG. 3 is a flowchart of forwarding an MPLS data packet in a hybrid networking environment according to an embodiment of the present invention.

Referring to FIG. 3, in a hybrid networking environment, a process of forwarding an MPLS data packet is as follows:

Step 300: After receiving the MPLS data packet, a first SR router in an SR network determines whether a next-hop router supports an SR characteristic.

In this embodiment of the present invention, each SR router in a Segment routing network advertises its own SR capability in an entire IGP domain by using an IGP extension. Therefore, each SR router may automatically learn whether a next-hop router supports the SR characteristic.

Step 310: When determining that the next-hop router does not support the SR characteristic, the first SR router encapsulates the to-be-sent MPLS data packet into an IP tunnel, and sends an encapsulated MPLS data packet to the next-hop router to enable the encapsulated MPLS data packet to be forwarded, based on an IP routing table, to a second SR router.

That is, the first SR router encapsulates the MPLS data packet into an IP data packet, and then forwards, based on an IP routing table, the IP data packet that is formed after encapsulation to the second SR router that serves as a destination of the tunnel.

In this embodiment of the present invention, when encapsulating the MPLS data packet into the IP tunnel, the first SR router fills in a source address of the IP tunnel with an IP address of the first SR router, and fills in a destination address of the IP tunnel with an IP address of the second SR router. The first SR router learns the IP address of the second SR router according to a node segment label (that is, a node segment label of the second SR router) at the top of a label stack of the MPLS data packet, that is, a mapping relationship exists between the node segment label of the second SR router and the IP address of the second SR router. The first SR router may learn the IP address of the second SR router according to the node segment label at the top of the label stack of the MPLS data packet when encapsulating the MPLS data packet into the IP tunnel.

According to another aspect, before encapsulating the MPLS data packet into the IP tunnel, the first SR router may determine, based on the node segment label of the second SR router, whether the node segment label is a global label, if the node segment label is a global label, further determine whether a penultimate hop pop (PHP) operation needs to be performed on the global label, where if the PHP operation needs to be performed, a pop operation is performed on the global label; or if the PHP operation does not need to be performed, a pop operation is not performed on the global label; or if the node segment label is a local label, the first SR router directly performs a pop operation on the local label.

In the foregoing embodiment, further, the first SR router learns, according to a notification of the second SR router, an IP tunnel encapsulation type (that is, a type of a header of an encapsulation IP tunnel) that is used when the MPLS data packet is encapsulated into the IP tunnel. For example, before encapsulating the MPLS data packet into the IP tunnel, the first SR router may learn, according to a tunnel encapsulation capability advertisement sent by the second SR router, the IP tunnel encapsulation type that is used when the MPLS data packet is encapsulated into the IP tunnel, for example, a generic routing encapsulation (GRE) tunnel type. Certainly, an IP tunnel encapsulation format that is to be used may also be agreed on in advance between SR routers in a system.

The following uses several specific application scenarios to further describe the foregoing embodiment in detail.

Figure 4:
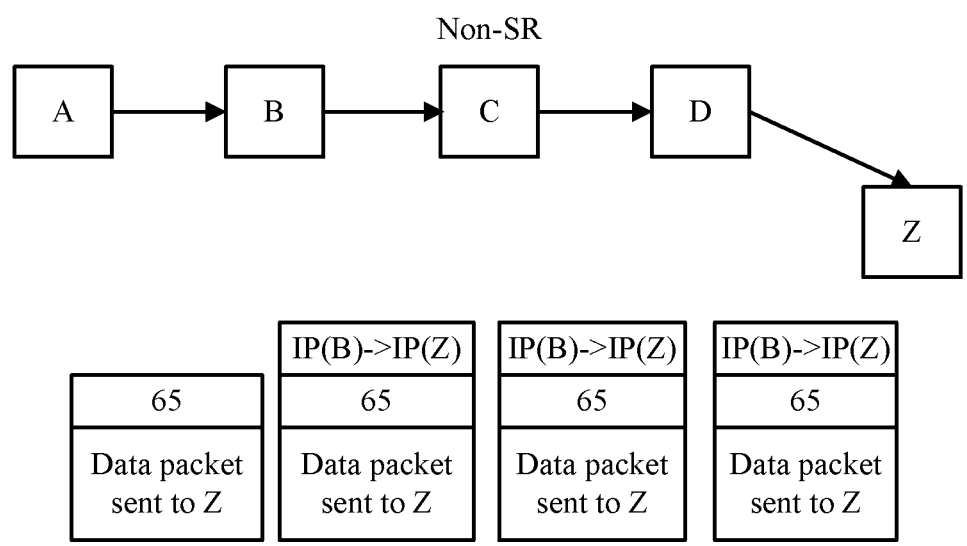
FIG. 4 is a first schematic diagram of forwarding an MPLS data packet in a hybrid networking environment according to an embodiment of the present invention.
Figure 5:
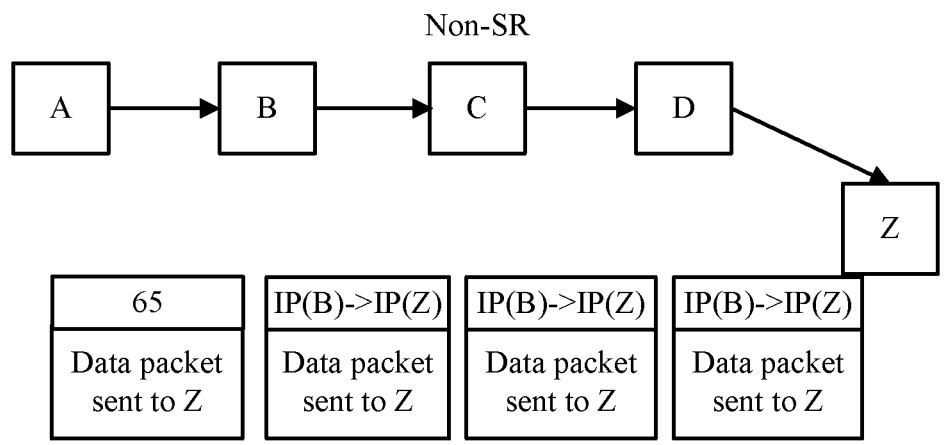
FIG. 5 is a second schematic diagram of forwarding an MPLS data packet in a hybrid networking environment according to an embodiment of the present invention.

It is assumed that A is an ingress SR router, B and D are intermediate SR routers, C is a Non-SR router, and Z is an egress SR router. In this case, when receiving, from A, an MPLS data packet whose top label is a node segment label (that is, "65") corresponding to Z, B finds that a next-hop (that is, element C) in an MPLS forwarding entry corresponding to the MPLS data packet is a non-SR router, and then, B determines whether the node segment label corresponding to Z is a global label. If the node segment label corresponding to Z is a global label, B further determines whether a PHP operation needs to be performed on the global label; if the PHP operation does not need to be performed, B directly encapsulates the MPLS data packet into an IP tunnel (for example, a GRE tunnel), and for details, refer to FIG. 4; if the PHP operation needs to be performed, B encapsulates the MPLS data packet into the IP tunnel after peeling the top label of the MPLS data packet, and for details, refer to FIG. 5. If the node segment label corresponding to Z is a local label, B directly encapsulates the MPLS data packet into the IP tunnel after peeling the top label of the MPLS data packet, and for details, refer to FIG. 5. A destination address of the IP tunnel is an IP address of Z, and a source address of the IP tunnel is an IP address of B. An encapsulated MPLS data packet is forwarded in a hop-by-hop IP forwarding manner, that is, is forwarded by using IP of C and D, and reaches a destination (that is, element Z) of the IP tunnel. Z performs IP tunnel decapsulation on the received data packet, and then performs corresponding processing on a decapsulated MPLS data packet.

Certainly, the foregoing example is described by using an example in which the MPLS data packet is forwarded from B to Z hop-by-hop and based on an IP routing table. In an actual application, if a network environment permits, an MPLS data packet B may also be directly forwarded from B to Z and based on the routing table.

Further, in this embodiment of the present invention, to make a node located at ingress of the IP tunnel (that is, element B) to learn an IP tunnel encapsulation format supported by an egress node of the IP tunnel (that is, element Z). The node Z advertises, by using an Interior Gateway Protocol (IGP) extension, an IP tunnel encapsulation format supported by the node Z to another SR router in an IGP domain. Specifically, Z may support one or more IP tunnel encapsulation formats, for example, a GRE tunnel and a User Datagram Protocol (UDP) tunnel.

Figure 6:
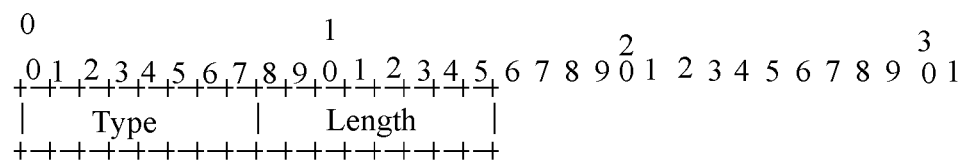
FIG. 6 is a schematic diagram of an encapsulation capability sub-type-length-value advertised by an SR router according to an embodiment of the present invention.

The ISIS is used as an example; Z may implement advertisement of the IP tunnel encapsulation format in the system by carrying, in a router capability type-length-value (Router Capability TLV), an encapsulation capability sub-type-length-value (Encapsulation Capability Sub-TLV) shown in FIG. 6.

A Type field of the encapsulation capability Sub-TLV is filled in with a Type code of an IP tunnel encapsulation format allocated by the Internet Assigned Numbers Authority (IANA), for example, Type code of the GRE tunnel=1 and Sub-TLV Type code of the UDP tunnel=2; if a Length field is set to 0, it indicates that a value field of the Sub-TLV is null.

In this embodiment of the present invention, hybrid networking of an SR router and a non-SR router is implemented, thereby a requirement for incremental deployment of SR networks is met. The Non-SR router (such as element C) may be a router that does not have an MPLS forwarding capability at all.

Figure 7:
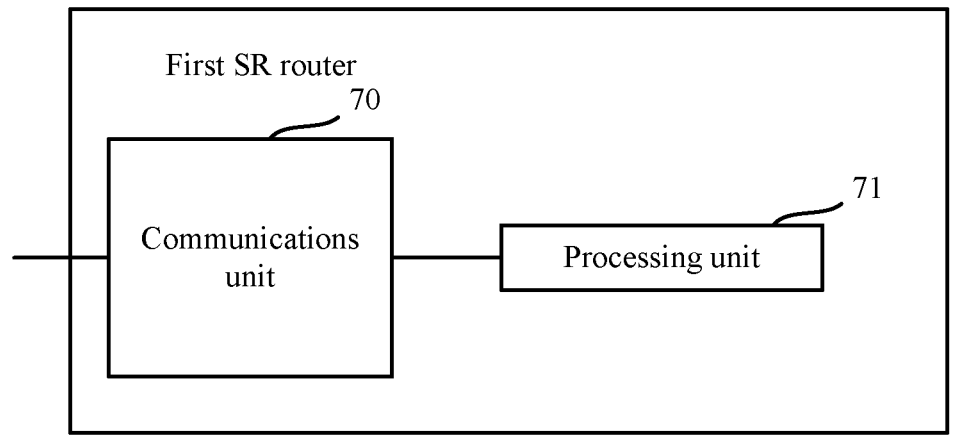
FIG. 7 and FIG. 8 are schematic structural diagrams of a first SR router according to an embodiment of the present invention.

Referring to FIG. 7, in an embodiment of the present invention, a first SR router includes a communications unit 70 and a processing unit 71, where:

the communications unit 70 is configured to receive an MPLS data packet; and the processing unit 71 is configured to encapsulate the MPLS data packet into an IP tunnel when determining that a next-hop router does not support an SR characteristic, and send an encapsulated MPLS data packet to the next-hop router by using the communications unit 70 to enable the encapsulated MPLS data packet to be forwarded, based on an IP routing table, to a second SR router.

That the processing unit 71 encapsulates the MPLS data packet into the IP tunnel specifically includes that:

the processing unit 71 fills in a source address of the IP tunnel with an IP address of the first SR router, and fills in a destination address of the IP tunnel with an IP address of the second SR router.

The processing unit 71 is further configured to:

learn the IP address of the second SR router according to a node segment label at the top of a label stack of the to-be-sent MPLS data packet, where the node segment label at the top of the label stack of the MPLS data packet is a node segment label of the second SR router.

Before the processing unit 71 encapsulates the MPLS data packet into the IP tunnel, the following is included:

the processing unit 71 determines whether the node segment label of the second SR router is a global label; and if the node segment label is a global label, the processing unit 71 further determines whether a penultimate hop pop (PHP) operation needs to be performed on the global label, where if the PHP operation needs to be performed, a pop operation is performed on the global label, or if the PHP operation does not need to be performed, a pop operation is not performed on the global label; or if the node segment label is a local label, the processing unit 71 directly performs a pop operation on the local label.

The processing unit 71 is further configured to:

before encapsulating the MPLS data packet into the IP tunnel, learn, according to a tunnel encapsulation capability advertisement sent by the second SR router, an IP tunnel encapsulation type that is used when the MPLS data packet is encapsulated into the IP tunnel.

Figure 8:
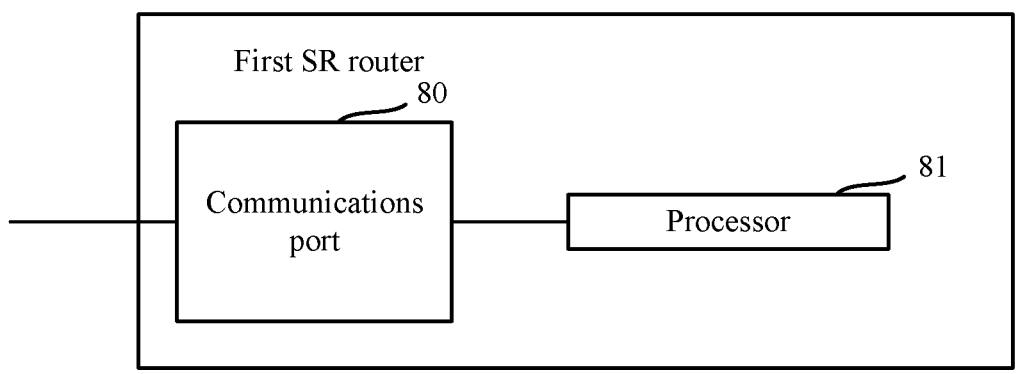

Referring to FIG. 8, in an embodiment of the present invention, a first SR router includes a communications port 80 and a processor 81, where:

the communications port 80 is configured to receive an MPLS data packet; and the processor 81 is configured to encapsulate the MPLS data packet into an IP tunnel when determining that a next-hop router does not support an SR characteristic, and send an encapsulated MPLS data packet to the next-hop router by using the communications port 80 to enable the encapsulated MPLS data packet to be forwarded, based on an IP routing table, to a second SR router.

That the processor 81 encapsulates the MPLS data packet into the IP tunnel specifically includes that:

the processor 81 fills in a source address of the IP tunnel with an IP address of the first SR router, and fills in a destination address of the IP tunnel with an IP address of the second SR router.

The processor 81 is further configured to:

learn the IP address of the second SR router according to a node segment label at the top of a label stack of the to-be-sent MPLS data packet, where the node segment label at the top of the label stack of the MPLS data packet is a node segment label of the second SR router.

Before the processor 81 encapsulates the MPLS data packet into the IP tunnel, the following is included:

the processor 81 determines whether the node segment label of the second SR router is a global label; and if the node segment label is a global label, the processor 81 further determines whether a penultimate hop pop PHP operation needs to be performed on the global label, where if the PHP operation needs to be performed, a pop operation is performed on the global label, or if the PHP operation does not need to be performed, the pop operation is not performed on the global label; or if the node segment label is a local label, the processor 81 directly performs a pop operation on the local label.

The processor 81 is further configured to:

before encapsulating the MPLS data packet into the IP tunnel, learn, according to a tunnel encapsulation capability advertisement sent by the second SR router, an IP tunnel encapsulation type that is used when the MPLS data packet is encapsulated into the IP tunnel.

By using the foregoing solution, correct forwarding of an MPLS data packet is completed in an environment of hybrid networking of an SR router and a non-SR router, thereby meeting a requirement for incremental deployment of SR networks.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, a person skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for forwarding a multiprotocol label switching (MPLS) data packet, comprising:

receiving, by a first segment routing (SR) router in an SR network, the MPLS data packet, wherein the first SR router has an MPLS forwarding capability;

encapsulating, by the first SR router, the MPLS data packet into an IP tunnel when a next-hop router is a non-SR router, wherein the non-SR router does not have an MPLS forwarding capability, and sending an encapsulated MPLS data packet to the next-hop router to enable the encapsulated MPLS data packet to be forwarded to a second SR router.

2. The method according to claim 1, wherein encapsulating the MPLS data packet into the IP tunnel comprises:
filling in, by the first SR router, a source address of the IP tunnel with an IP address of the first SR router, and filling in a destination address of the IP tunnel with an IP address of the second SR router.

3. The method according to claim 2, further comprising:
determining, by the first SR router, the IP address of the second SR router according to a node segment label at the top of a label stack of the MPLS data packet, wherein the node segment label at the top of the label stack of the MPLS data packet is a node segment label of the second SR router.

4. The method according to claim 3, wherein the node segment label is a global label, and before encapsulating the MPLS data packet into the IP tunnel, the method further comprises:
performing, by the first SR router, a pop operation on the global label when a penultimate hop pop (PHP) operation needs to be performed.

5. The method according to claim 3, wherein the node segment label is a local label, and before encapsulating the MPLS data packet into the IP tunnel, the method further comprises:
performing, by the first SR router, a pop operation on the local label.

6. The method according to claim 1, wherein before encapsulating the MPLS data packet into the IP tunnel, the method further comprises:
determining, by the first SR router according to a tunnel encapsulation capability advertisement sent by the second SR router, an IP tunnel encapsulation type that is used when the MPLS data packet is encapsulated into the IP tunnel.

7. A first segment routing (SR) router, comprising:
a receiver configured to cooperate with a processor to receive a multiprotocol label switching (MPLS) data packet;
the processor configured to encapsulate the MPLS data packet into an IP tunnel when a next-hop router is a non-SR router, wherein the first SR router has an MPLS forwarding capability, the non-SR router does not have an MPLS forwarding capability;
a transmitter configured to cooperate with the processor to send an encapsulated MPLS data packet to the next-hop router to enable the encapsulated MPLS data packet to be forwarded to a second SR router.

8. The first SR router according to claim 7, wherein the processor is further configured to:
fill in a source address of the IP tunnel with an IP address of the first SR router, and fill in a destination address of the IP tunnel with an IP address of the second SR router.

9. The first SR router according to claim 8, wherein the processor is further configured to:
determine the IP address of the second SR router according to a node segment label at the top of a label stack of the MPLS data packet, wherein the node segment label at the top of the label stack of the MPLS data packet is a node segment label of the second SR router.

10. The first SR router according to claim 9, wherein the node segment label is a global label, and before encapsulate the MPLS data packet into the IP tunnel, the processor is configured to:
perform a pop operation on the global label when a penultimate hop pop (PHP) operation needs to be performed.

11. The first SR router according to claim 9, wherein the node segment label is a local label, and before encapsulate the MPLS data packet into the IP tunnel, the processor is configured to:
perform a pop operation on the local label.

12. The first SR router according to claim 7, wherein before encapsulate the MPLS data packet into the IP tunnel, the processor is further configured to:
determine, according to a tunnel encapsulation capability advertisement sent by the second SR router, an IP tunnel encapsulation type that is used when the MPLS data packet is encapsulated into the IP tunnel.

13. A non-transitory computer readable medium, comprising processor-executable instructions which when executed by a processor of a first segment routing (SR) router in an SR network, causes the first SR router to implement the following method for forwarding a multiprotocol label switching (MPLS) data packet, the method comprising:
receiving the MPLS data packet, wherein the first SR router has an MPLS forwarding capability;
encapsulating the MPLS data packet into an IP tunnel when a next-hop router is a non-SR router, wherein the non-SR router does not have an MPLS forwarding capability, and
sending an encapsulated MPLS data packet to the next-hop router to enable the encapsulated MPLS data packet to be forwarded to a second SR router.

14. The non-transitory computer readable medium according to claim 13, wherein encapsulating the MPLS data packet into the IP tunnel comprises:
filling in, a source address of the IP tunnel with an IP address of the first SR router, and filling in a destination address of the IP tunnel with an IP address of the second SR router.

15. The non-transitory computer readable medium according to claim 14, wherein the method further comprises:
determining, the IP address of the second SR router according to a node segment label at the top of a label stack of the MPLS data packet, wherein the node segment label at the top of the label stack of the MPLS data packet is a node segment label of the second SR router.

16. The non-transitory computer readable medium according to claim 15, wherein the node segment label is a global label, and before the encapsulating the MPLS data packet into the IP tunnel, the method further comprises:
performing, a pop operation on the global label when a penultimate hop pop (PHP) operation needs to be performed.

17. The non-transitory computer readable medium according to claim 15, wherein the node segment label is a local label, before encapsulating the MPLS data packet into the IP tunnel, the method further comprises:
performing, a pop operation on the local label.

18. The non-transitory computer readable medium according to claim 13, wherein before encapsulating the MPLS data packet into the IP tunnel, the method further comprises:
determining, according to a tunnel encapsulation capability advertisement sent by the second SR router, an IP tunnel encapsulation type that is used when the MPLS data packet is encapsulated into the IP tunnel.

* * * * *